Nov. 6, 1951 E. W. BREISCH 2,574,167

PORTABLE AND EMERGENCY EQUIPMENT FOR INDUCTIVE CARRIER COMMUNICATION SYSTEMS

Filed May 23, 1950 4 Sheets-Sheet 1

INVENTOR.
Edgar W. Breisch.
BY
[signature]
HIS ATTORNEY

Nov. 6, 1951 E. W. BREISCH 2,574,167

PORTABLE AND EMERGENCY EQUIPMENT FOR INDUCTIVE CARRIER COMMUNICATION SYSTEMS

Filed May 23, 1950 4 Sheets-Sheet 2

INVENTOR.
Edgar W. Breisch.
BY
[signature]
HIS ATTORNEY

Nov. 6, 1951 E. W. BREISCH 2,574,167

PORTABLE AND EMERGENCY EQUIPMENT FOR INDUCTIVE CARRIER COMMUNICATION SYSTEMS

Filed May 23, 1950 4 Sheets-Sheet 3

INVENTOR.
Edgar W. Breisch.
BY
[signature]
HIS ATTORNEY

INVENTOR.
Edgar W. Breisch
BY
HIS ATTORNEY.

Patented Nov. 6, 1951 2,574,167

UNITED STATES PATENT OFFICE 2,574,167

PORTABLE AND EMERGENCY EQUIPMENT FOR INDUCTIVE CARRIER COMMUNICATION SYSTEMS

Edgar W. Breisch, Edgewood, Pa., assignor to Westinghouse Air Brake Company, a corporation of Pennsylvania Application May 23, 1950, Serial No. 163,590

9 Claims. (Cl. 179—1)

Figure 1:
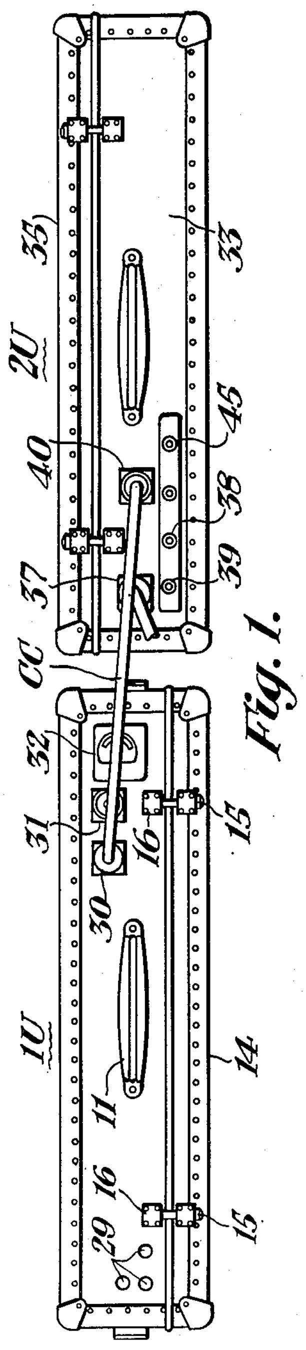

My invention relates to portable and emergency equipments for inductive carrier communication systems, and more particularly to portable and emergency equipments for inductive carrier communication systems for railway trains.

In communication systems for railway trains, communication is usually provided between the front and rear ends of a train, between different trains, and between a train and a way side station. Also, portable equipments have been provided for such train communication systems. Such a portable equipment is carried by a trainman when inspecting the train and doing flagging and switching duties and by it the trainman is enabled to keep in better touch with the other members of the train crew and also with the operator of any nearby tower. Such a portable equipment is also useful at the location of an accident or at the location where some special work is being done and thereby enable the wreck master and work supervisor to keep in touch with the crew of trains in the vicinity of the particular location.

In view of the foregoing conditions for railway train communication systems, a feature of my invention is the provision of novel and improved portable equipment for inductive carrier communication systems.

Another feature of my invention is the provision of portable equipment that can be used as an emergency wayside station for railway train communication systems.

Again, a feature of my invention is the provision of improved portable railway train inductive carrier communication equipment that can be operated either from a self-contained battery or from a power supply line.

Other features, objects and advantages embodying my invention will appear as the specification progresses.

The apparatus set forth in the present application is similar in certain features to that disclosed in a prior copending application for Letters Patent of the United States, Serial No. 139,093, filed January 17, 1950, for Transmitting and Receiving Circuits for Inductive Carrier Communication Systems, by Kenneth E. Doriot, and the said copending application contains claims covering certain improvements in the inductor structure which is disclosed but not claimed in the present application.

The foregoing features, objects and advantages of my invention are obtained by the provision of two portable units which are preferably of like size and appearance. The apparatus of the first unit includes a light weight portable housing, a transmitter and a receiver which are capable of using a given carrier communication or telephone current, a combination transmitting and receiving loop circuit, a power pack make up of dry cell batteries, and a handset. The housing is a sturdy flat rectangular case of the conventional suitcase form and which case is provided with a handle and a shoulder strap to enable the unit to be carried by a trainman at his side as he goes about his duties. The case is of light weight material and of a structure to prevent the entrance of moisture under adverse weather conditions, and due to this constructure the unit is capable of being used at outdoor locations. A hinged door is provided as a major section of one side wall of the case to allow ready and convenient access to the apparatus. The case is constructed with means whereby a weathertight seal is formed when the door is closed.

The transmitter and receiver are assembled on a single chassis secured inside the case a given distance above the bottom of the case. The power pack includes a small box in which the dry cell batteries are placed and which box is designed to fit inside the case adjacent one end of the chassis.

The transmitting and receiving loop circuit is mounted in a shallow recess formed in the inside walls around the inside periphery of the case. This loop circuit constitutes an air core coil having an area substantially equal to that of the case. The size of the electrical conductor and number of turns of the coil are selected to provide a desired inductive relation with the transmitting line circuit, the coil being further selected as to its size so that it will go in a case which is not too large to be easily carried. This coil is connected to the output of the transmitter and to the input of the receiver in such a manner as to form a combined transmitting and receiving loop circuit.

The handset is provided with a push-to-talk switch and a retractile cord and it is supported in a cradle or hook switch in an enclosing recess built in the door, the handset being available from the outside of the case. Terminals and a plug connector receptacle, together with a voltmeter, are mounted in the top of the case. It is to be seen from the foregoing description of the case that all vital parts of the apparatus of the first unit are confined within the walls of the case and there are no projecting elements which may be easily demaged or which may endanger the one carrying the unit by catching onto cars or other equipment.

The actual use of the first unit requires only the removal of the handset from the hook switch and the closing of a battery switch, the apparatus being normally set to receive when the battery switch is closed. To send, the push-to-talk switch is closed to switch the power pack from the receiver to the transmitter. Thus, the first unit alone constitutes a portable equipment having a self-contained power source and which equipment provides two-way one channel communication with other equipments of the system, such other equipments being an equipment mounted on a locomotive, in a cabin car, or at a wayside tower, or another portable equipment.

The apparatus of the second unit comprises a light weight portable housing, an alternating current power line connection and a transformer-rectifier network for converting alternating current into direct current, an audio amplifier with a loud-speaker, a call oscillator, and a control relay. The housing is a case which is preferably of the same size and construction as the case of the first unit. The two cases are constructed substantially alike to economize the manufacturing thereof, to provide a pleasing appearance when they are used together and to facilitate the practical use of the two units. The second unit also includes a plug connector receptacle which is constructed to cooperate with the plug connector receptacle of the first unit to enable the apparatuses of the two units to be interconnected by a cable the two ends of which are provided with plug units. This interconnecting cable and a power line circuit connecting cable are carried inside of the case of the second unit when not in use.

When the two units are to be used together, the interconnecting cable is plugged into the two connector receptacles and the power line connecting cable is connected to a commercial alternating current power circuit. When the alternating current power is applied to the second unit, the dry cell battery of the first unit is automatically disconnected and the power for the aparatus of both units is supplied from the transformer-rectifier network. Thus when the two units are used together they constitute an emergency wayside station which can be powered from a commercial power line and which station provides two-way single channel communication with either train carried stations or other wayside stations.

It should be here noted that in inductive carrier train communication systems the existing line wires and other conductors paralleling the track are used as the transmitting medium or circuit for conveying the communication current along the railway. These line wires and other conductors are elements of the transmitting medium due to the longitudinal circuit formed by the line wires and other conductors, the distributed impedance of the line wires and other conductors to ground, and the ground return path. The equipments of two remote stations are brought into communication relationship with each other by each equipment being provided with circuit elements which are arranged for electrical coupling with the transmitting medium.

I shall describe one form of portable and emergency equipment embodying my invention and shall then point out the novel features thereof in claims.

Figure 2:
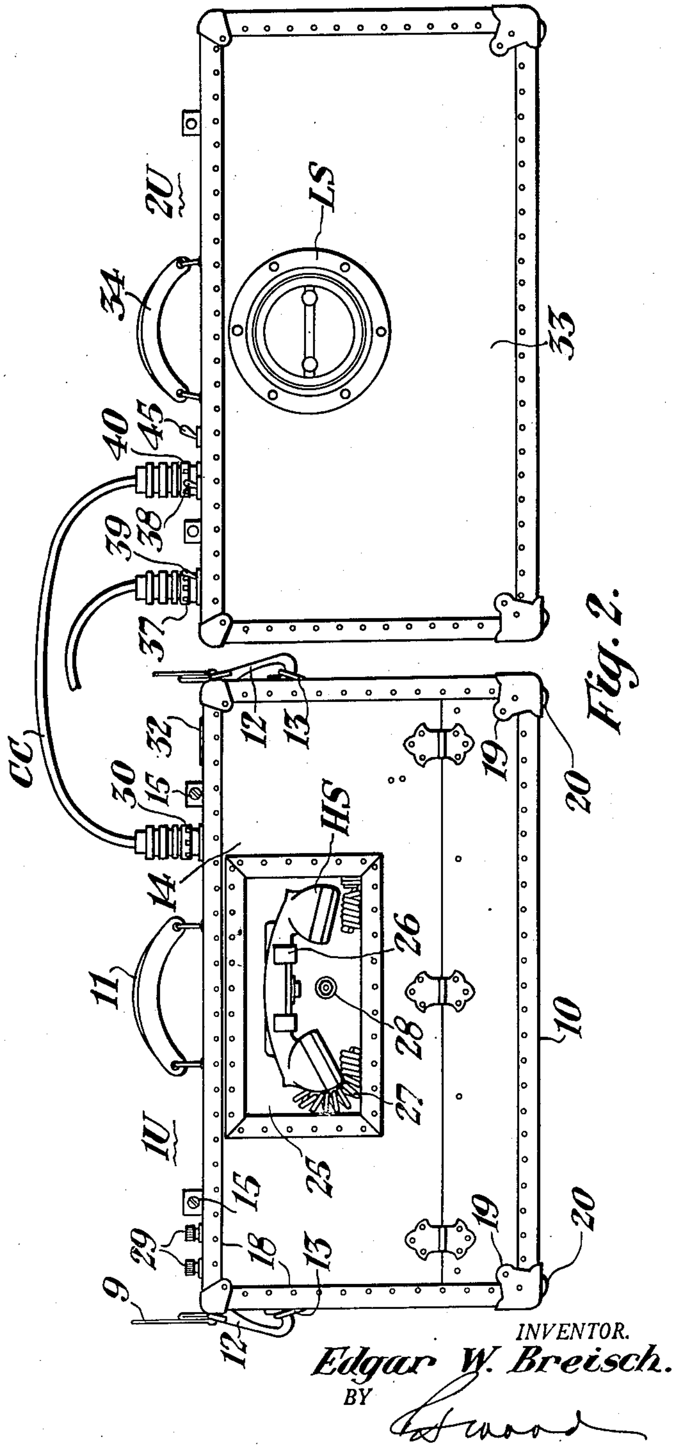

In the accompanying drawings, Figs. 1 and 2 are top and front views, respectively, showing a preferred construction of the cases for a first and a second portable unit embodying my invention.

Figure 4:
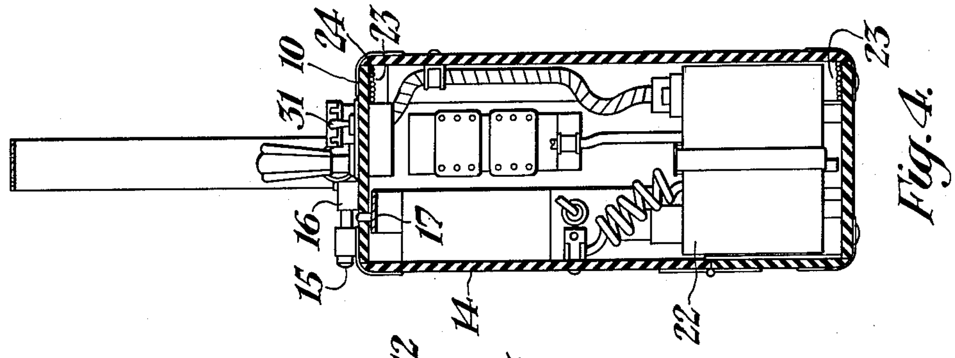
Figure 3:
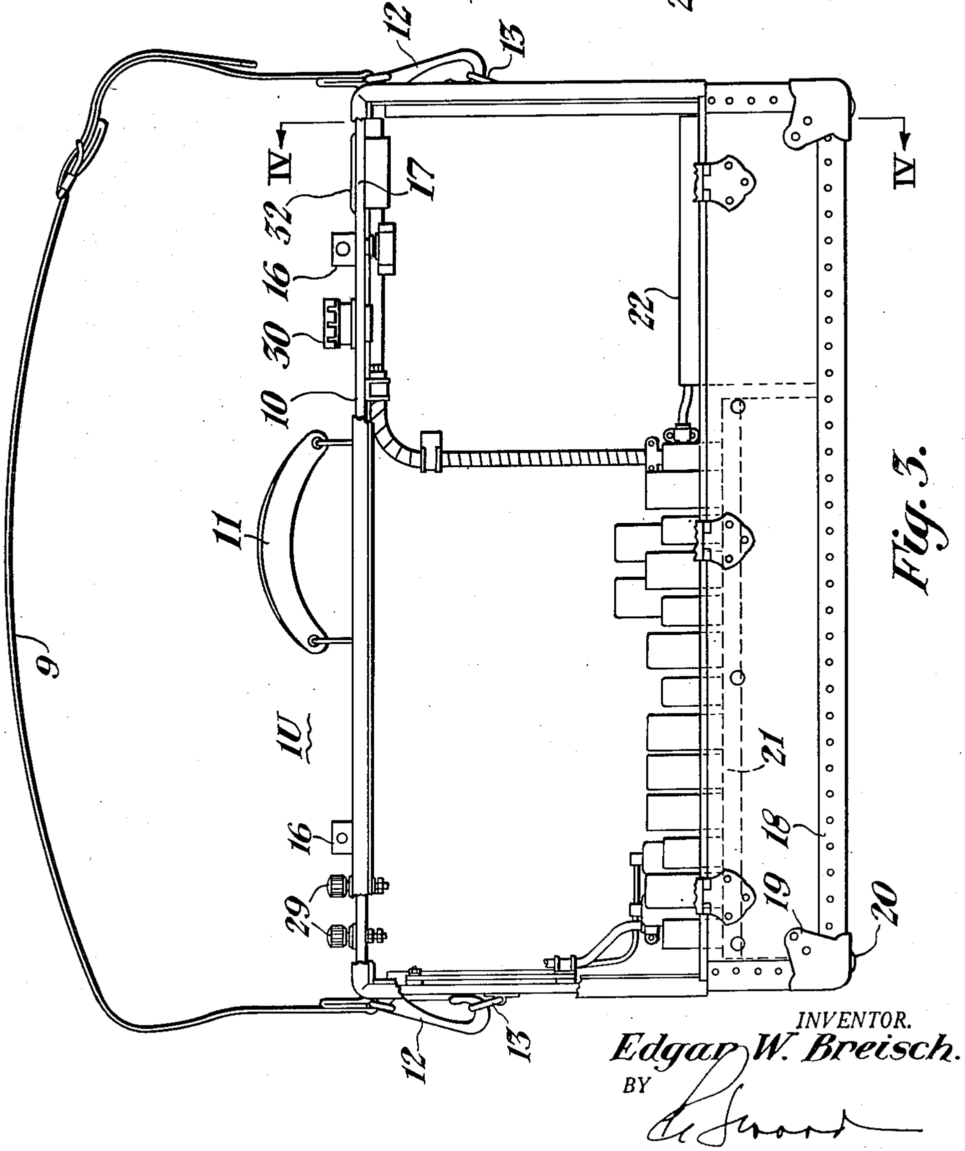
Figure 6:
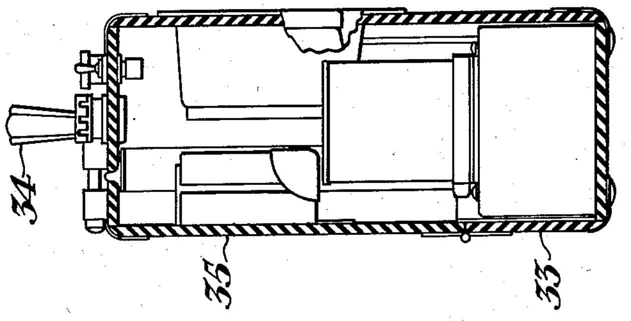
Figure 5:
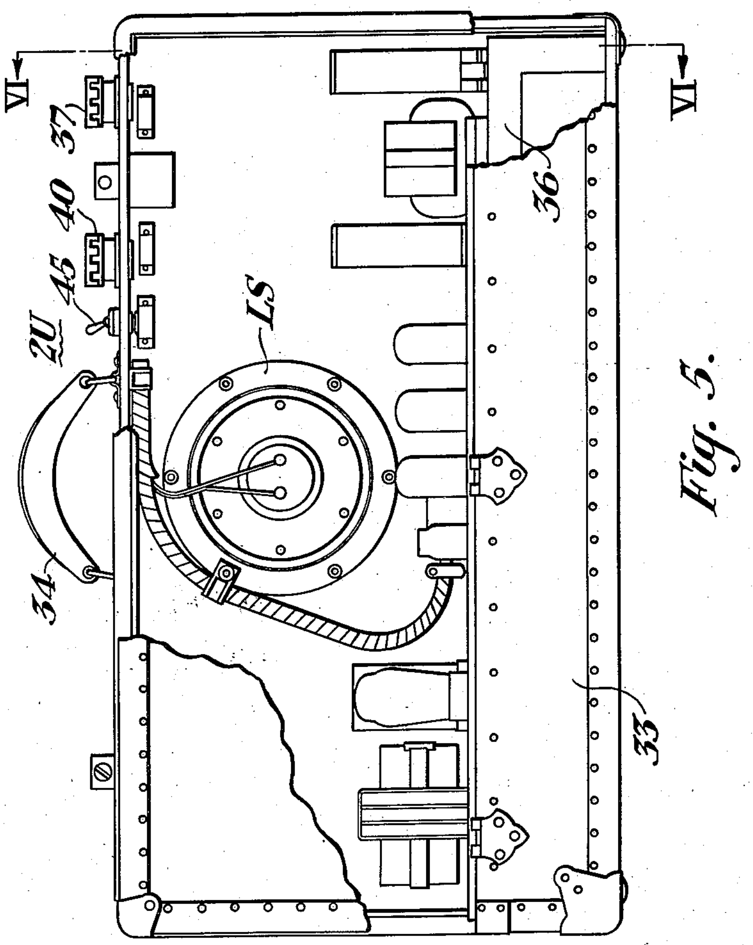
Figure 7:
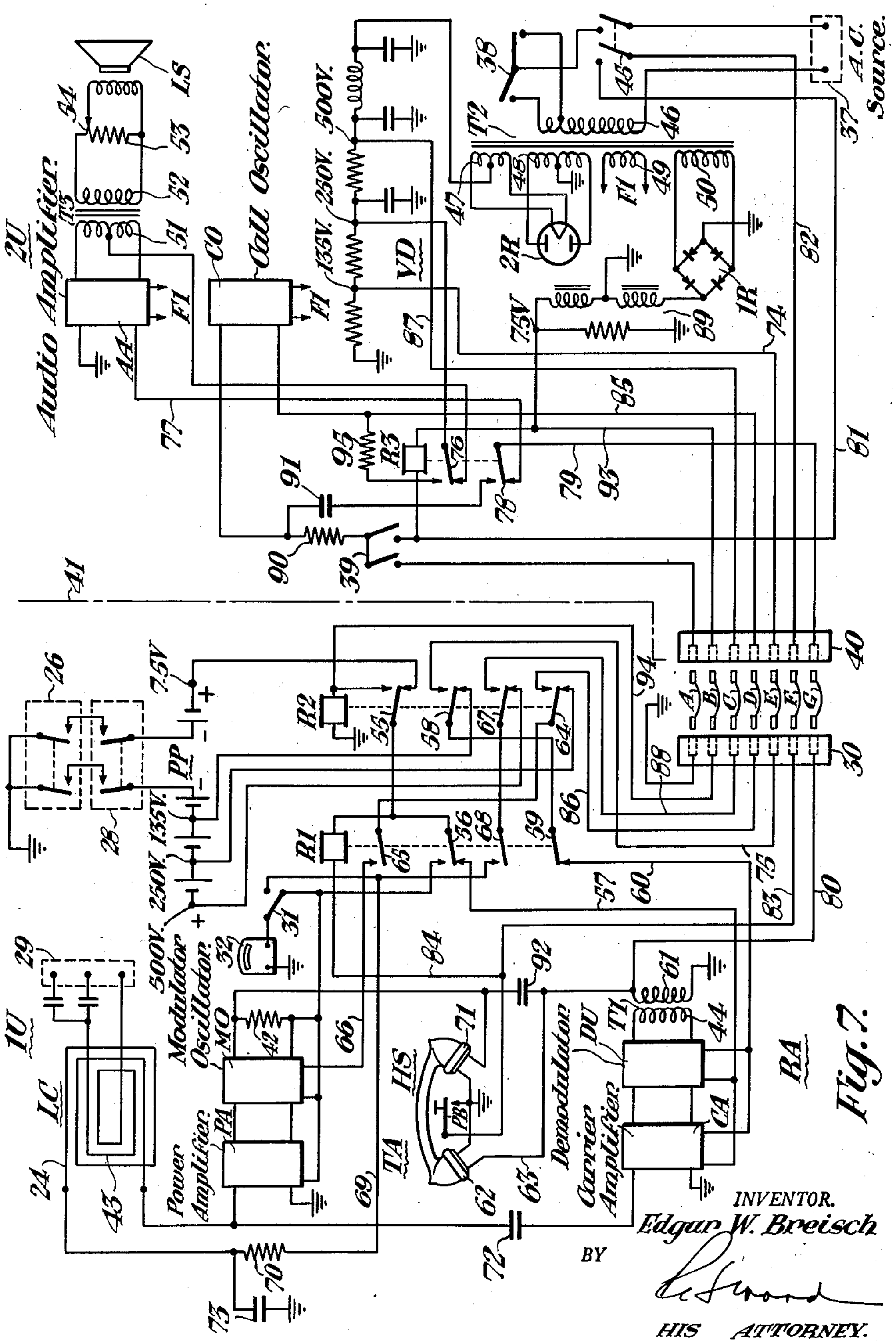

Figs. 3 and 4 are side and end views, respectively, showing the first unit, Fig. 3 showing the inside of the case when the door is broken away, and Fig. 4 being a sectional view taken on the line IV—IV of Fig. 3. Figs. 5 and 6 are side and end views, respectively, showing the second unit, Fig. 5 showing the inside of the case with the door broken away and Fig. 6 being a sectional view taken on the line VI—VI of Fig. 5. Fig. 7 is a diagrammatic view showing interconnecting circuits that may be used with the apparatuses of the first and second units embodying the invention.

In each of the several views like reference characters designate similar parts.

Referring to the drawings, the reference characters 1U and 2U designate a first and a second unit of the equipment. Looking at the first unit 1U, its construction comprises a case 10 of any suitable material, such as fiber or plywood covered with fiber. This case 10 is preferably of a flat rectangular shape, that is, it is made in the shape of a conventional suitcase, the dimensions of which are determined as required to house the apparatus of the first unit. The two longitudinal walls of the case form a top and a bottom panel, respectively, and the case is provided with a handle grip 11 of suitable material, such as leather, secured to the top panel of the case. Also, an adjustable shoulder strap 9 of webbing material is provided with snaps 12 which snap into rings 13 which are secured one in each end wall or panel of the case. It follows that the case 10 can be carried by a trainman either by the handle 11 or by the shoulder strap 9, the case hanging at the side of the one carrying the unit.

A hinged door 14 is provided as a major portion of the front wall or panel of the case 10. The size of the door allows ready and convenient access to the interior of the case. Two slotted head machine screws 15 are anchored in the top edge of the door. The screws 15 engage with threaded members 16 anchored to the top panel of the case so that pressure is applied against a resilient gasket 17 to form a substantially weathertight seal when the door is closed and the machine screws 15 are run down. The lower portion of the case 10 is of a solid box-like construction to give the case strength and to enable it to be set upright on the ground. In order to prevent the entrance of moisture under adverse weather conditions, all seams of the case are covered with strips 18 of heavy gauge material, such as fiber, and which strips are riveted to the case at a reasonably close spacing. The bottom corners are protected with formed metal members 19 which have extended embossed pads 20 to serve as feet. The top corners are similarly protected except the sections are without feet. The entire outside of the case is coated with suitable weatherproofing paint.

As best shown in Fig. 3, a chassis 21 of suitable light material, such as aluminum, is secured inside the case by rivets or screws. The chassis 21 is positioned some distance above the bottom of the case and it is made to extend a given portion of the length of the case. The chassis is formed for the mounting of the various elements of the transmitter and the receiver and the control relays of the unit. These elements are outlined by light lines in Fig. 3, the specific structure of the elements forming no part of the present invention.

Adjacent to the chassis 21 and at the right-hand end of the case as viewed in Fig. 3, there is housed a battery box compartment 22 of any suitable material. This battery box is of a size preselected for the box to house dry cell batteries which when connected together electrically supply the necessary voltages for the different electron tube circuits of the transmitter and receiver.

As best shown in Figs. 3 and 4, a recess 23 is formed around the inside walls of the case 10 to extend the full longitudinal inside periphery of the case. In this recess 23 there is mounted a combined transmitting and receiving loop circuit coil 24. This coil 24 is made up of a selected number of turns of insulated wire of suitable gauge and it is connected to the transmitter and receiver in a manner to be described hereinafter. This coil 24 forms an air core inductor which has an area which is substantially the same as that of the case 10. With this loop circuit coil mounted inside of the case, it is protected against coming in contact with the person carrying the unit. Also, the coil is protected against mechanical injury due to the unit being carried about. Thus the gauge of the wire used to make up the coil 24 need not be any larger than required to provide the desired electrical characteristics. For reasons to appear hereinafter, the loop circuit is preferably provided with a second coil 43 (see Fig. 7), the two coils 24 and 43 being independent coils. As will be apparent by an inspection of Figs. 3 and 4, the size of the case 10 is determined largely by the desirable size of the air core coil for the unit.

The door 14 is formed with a recess 25, the dimensions of the recess 25 being selected suitable for a standard size handset HS to be carried in a cradle or hook switch 26 within the recess. This handset HS is provided with a retractile cord 27 having conductors by which the handset is connected to the transmitter and receiver in a manner to be described when the operation of the unit is described. The cord 27 enables the unit to be used while carried by a trainman and also used by an operator several feet away when the unit is set down on the ground. In the recess 25 and just below the hook switch 26 there is mounted a toggle switch 28 for governing the connections of the batteries of the unit in a manner to later appear.

The top panel of the case 10 has mounted thereon line and ground connection terminals 29, a plug connector receptacle 30, a battery output indicator switch 31, and a dual range weather sealed voltmeter 32, and each of which elements is connected to an associated element of a transmitter and receiver of the assembly by suitable cable connections.

The unit 2U is provided with a case 33 which is preferably of substantially the same size and construction as the case 10 of the first unit, except the case 33 is provided with a carrying handle 34 but with no shoulder strap. It is clear, however, that the case 33 can be provided with a shoulder strap similar to the strap 9 if desired. Also, as shown in Figs. 1 and 5, a door 35 of the case 33 forms a major portion of the back wall or panel of the case, whereas in case 10 of unit 1U the door 14 is formed in the front panel of the case. Furthermore, the door 35 of the second unit is without a handset recess. In the front panel of the case 33 of the second unit a loudspeaker LS is mounted.

A chassis 36 is secured in the case 33 as by rivets and screws, the chassis 36 extending the full length of the case. Mounted on this chassis 36 are the necessary components of an amplifier, a call or calling tone oscillator, a power pack including a transformer-rectifier network and an alternating current power connection, and a control relay, these various elements of the apparatus of the second unit being indicated by light lines in Figs. 5 and 6. In the top panel of the case 33 there are mounted a receptacle 37 for an alternating current power line cable, a power switch 45, a line voltage switch 38 (see Fig. 1), a call signal control switch 39, and a plug connector receptacle 40. It follows that this second unit can be carried to a designated point independent of the first unit and connected to any suitable source of alternating power by means of the line cable receptacle 37. Also, the second unit can be interconnected to the first unit by a suitable cable CC being plugged into the receptacles 40 and 30 of the two units. When thus connected the two units can be used as a two-way single channel wayside station.

The apparatus and circuits of the two units 1U and 2U are shown diagrammatically in Fig. 7. The apparatus and circuits of the first unit 1U are shown to the left of the dash and dot line 41 and those of the second unit 2U are shown to the right of the line 41. Looking at the apparatus of unit 1U, the primary devices comprise a transmitter TA, a receiver RA, a power pack PP, a handset HS, a loop circuit LC, and control relays R1 and R2.

The transmitter TA comprises a modulator-oscillator MO and a power amplifier PA shown in block form. These assemblies may take any one of several forms for supplying a modulated communication current. It is sufficient for the present application to point out that the modulator-oscillator MO may include a carrier oscillator having an input connected across a resistor 42 in such a manner that the carrier is frequently modulated by voice frequencies applied across the resistor 42. Also, the output of the oscillator is connected to the input of the power amplifier PA. The power amplifier PA may take any one of several forms of amplifiers and the output here includes the coil 24 of the loop circuit LC. The receiver RA includes a carrier amplifier CA and a demodulator DU which are shown in block form since they can be of any one of several known arrangements for such devices and when used with the apparatus of the transmitter referred to above they would use a frequency modulated carrier current similar to that supplied by the transmitter. The amplifier CA may be of any standard form suitable to amplify a frequency modulated carrier telephone current and the demodulator DU may be of the superheterodyne form suitable to mix the output of the amplifier CA with local oscillations and supply to the primary winding 44 of an output transformer T1 a voice frequency current.

As an aid in understanding the apparatus, I shall assume that a carrier of 144 kc. is used and this carrier is frequently modulated by a voice frequency band of 300 to 3000 cycles per second, but it is apparent that other frequencies can be used. Thus when the transmitter TA is energized and voice frequencies are applied across the resistor 42, a 144 kc. carrier current frequency modulated by the voice frequencies is supplied to the coil 24 of the loop circuit. Also, when the receiver RA is energized and electromotive forces of a 144 kc. carrier frequency modulated by voice frequencies are picked up by the coil 24 of the loop circuit, the current is demodulated and the voice frequency current is supplied to the winding 44 of the transformer T1.

The power pack PP comprises a high and a low voltage battery, each of which includes a selected number of dry cells. The high voltage battery is provided with several terminals from which different voltages can be obtained. As shown, there are three terminals indicated at 135V, 250V, and 500V, from which voltages of 135, 250, and 500 volts can be obtained. The low voltage battery provides but a single voltage of, say 7.5 volts, the positive terminal of this battery being indicated at 7.5V. The negative terminals of the batteries are connected to ground through the battery switch 28 and the hook switch 26 in series.

The essential elements of the second unit 2U comprise a power pack which includes a power transformer T2, a first rectifier 1R, a second rectifier 2R and a voltage divider and filter network VD, and audio amplifier AA, a loud-speaker LS, a call or calling tone oscillator CO, and a control relay R3. The transformer T2 is provided with a primary winding 46 which is connected across the terminals of the power line receptacle 37 through the voltage switch 38 and the power switch 45, the arrangement being such that when the switch 45 is closed the full winding 46 is connected across the terminals 37 through a first position of the switch 38, and a selected portion of the winding 46 is connected across the terminals 37 through a second position of the switch 38. The transformer T2 is provided with four independent secondary windings 47, 48, 49, and 50. The winding 50 is connected to the input terminals of the first rectifier 1R, the rectifier 1R being preferably a full wave rectifier of the dry surface contact type. The secondary windings 47 and 48 are connected to the second rectifier 2R, which is preferably a dual diode, the winding 47 having its outside terminals connected to the filament of the rectifier tube 2R, the outside terminals of winding 48 being connected to the two anode elements of the tube 2R, the mid terminal of winding 48 being connected to ground and the mid terminal of the winding 47 being connected to the filter and voltage divider network VD. The arrangement of the power pack is such that a relatively low voltage 7.5 volts is applied to a terminal 7.5V of the second unit from the first rectifier 1R, and several voltages are supplied at the different terminals of the voltage divider VD, the voltages of 500, 250 and 135 volts being supplied at the terminals 500V, 250V and 135V, respectively. It is to be noted that these voltage terminals for the unit 2U correspond to similar voltage terminals of the battery of the power pack PP of the unit 1U.

The secondary winding 49 of the transformer T2 is connected to the heater elements of the tubes of the amplifier AA and the oscillator CO through a connection which is indicated by the circuit F1.

The audio amplifier AA is of standard form suitable to amplify voice frequency current applied to its input. Preferably this amplifier includes tubes connected in a push-pull arrangement, and the output of the tubes includes a primary winding 51 of a transformer T3, a secondary winding 52 of which is connected to a resistor 53 having an adjustable terminal 54 and one outside terminal connected to the operating winding of the loudspeaker LS.

The call oscillator CO is shown conventionally and it is preferably of the electron tube type arranged to supply a predetermined voice frequency of, say 1700 cycles per second, such current being used as the calling tone.

In using the unit 1U alone as a portable equipment, the switch 28 is closed to prepare the connection of the power pack PP to the circuits of the transmitter and receiver. Then when the handset HS is removed from its hook switch so that the switch 26 is closed, the power pack is connected to the circuits. Normally, that is, when the apparatus is in the standby position, the receiver RA is energized and the transmitter TA is de-energized. In energizing the receiver RA power is applied to the heaters of the tubes of the receiver over a circuit which includes terminal 7.5V, back contact 55 of relay R2, back contact 56 of relay R1 and wire 57, the return side of the circuit being completed through ground. Power is also supplied from terminal 135V of the power pack to the anode circuits from the tubes of the receiver, this circuit including terminal 135V, back contact 58 of relay R2, back contact 59 of relay R1 and wire 60, the return side of the circuit being completed through ground. Thus any electromotive force of the carrier telephone current picked up by the coil 24 of the loop circuit is applied to the input of the receiver through the input circuit including capacitors 72 and 73 and the current is amplified and demodulated and the voice frequency current induced in the winding 61 of the transformer T1. This voice frequency current thus induced in the winding 61 will in turn be applied to the earphone 62 of the headset through an obvious circuit which includes wire 63 and the ground connection.

When the operator wishes to send, he will first press the push button switch PB. The closing of switch PB completes a circuit for energizing the relay R1, the circuit extending from terminal 7.5V through back contact 55 of relay R2, winding of relay R1, wire 84, and switch PB to ground. The picking up of relay R1 to open back contacts 56 and 59 removes power from the receiver RA. The closing of front contact 56 of relay R1 applies power from the terminal 7.5V to the heaters of the tubes of the devices MO and PA of the transmitter. Also, power is supplied from terminal 250V to the anodes of the tubes of the device MO through a circuit including back contact 64 of relay R2, front contact 65 of relay R1, and wire 66. Furthermore, power is applied from the high voltage terminal 500V of the power pack to the anode circuit of the power amplifier PA through a circuit including back contact 67 of relay R2, front contact 68 of relay R1, wire 69, resistor 70, coil 24 of the loop circuit, the anode circuit for the tubes of the power amplifier PA and ground.

With the closing of front contact 56 of relay R1, the microphone circuit for the headset is formed, the circuit extending from terminal 7.5V, through back contact 55 of relay R2, front contact 56 of relay R1, resistor 42, microphone 71 of the headset and thence through the ground return to the battery. Thus the operator by speaking into the microphone 71 after having pressed the push button PB will cause the voice frequencies of the speech to be created across resistor 42 and applied to the transmitter and a corresponding frequency modulated telephone current will be supplied to the coil 24 of the loop circuit, the current flowing in the coil 24 being available for inducing a corresponding electromotive force in the transmitting line circuit with which the loop circuit is positioned for inductive relationship. Consequently, the operator by means of the push button PB of the unit 1U can alternately condition the apparatus of the unit to receive and to send.

It is to be observed that with the switch 31 closed in the position shown in Fig. 7, the voltmeter 32 will indicate the voltage of the low voltage battery, and with the switch 31 moved to the second position the voltmeter 32 will indicate the voltage of the high voltage battery. Also, the high voltage of the battery is blocked from the input of the receiver RA by means of the capacitors 72 and 73. It is to be pointed out that the inductor coil 24 can be disposed for its most effective induction with the transmitting line circuit by moving the case to place the coil so that its vertical plane is parallel with the line wires.

When the two units 1U and 2U are used together as an emergency equipment or as a wayside station equipment, the two units are independently carried to the given location and placed side by side as illustrated in Figs. 1 and 2 and the connecting cable CC is plugged into the receptacles 30 and 40. Also, the connection of the alternating current power line is made to the receptacle 37 and the switches 38 and 45 are closed, the switch 38 being set at its first position or second position according as the voltage of the alternating current supply is high or low. With the transformer T2 energized by alternating current, a full wave rectified current of a voltage of 7.5 volts is applied to the terminal 7.5V of unit 2U through a filter network 89. Current then flows from terminal 7.5V of the second unit through wire 93, conductor B of the cable CC, wire 94, winding of relay R2 and ground, and the relay R2 is picked up. The picking up of the relay R2 serves to automatically disconnect the connection of the power pack PP of the first unit, the connection being opened at the back contacts of the relay R2. Also, a full wave rectified current is supplied to the voltage divider VD from the transformer windings 47 and 48 through the second rectifier 2R so that the several voltages appear at the terminals of the voltage divider VD. Power is also supplied from winding 49 of the transformer T2 to the heaters of the tubes of the devices CO and AA of the second unit and these devices are in an active condition.

The receiver RA of the first unit is now powered from the power pack of the second unit, current flowing from the terminal 7.5V of the second unit to the heaters of the tubes of the receivers RA through a connection including wire 93, cable conductor B, wire 94, front contact 55 of relay R2, back contact 56 of relay R1 and wire 57. The anode circuits for the tubes of the receiver are powered from the terminal 135V of the voltage divider of the second unit through a circuit that includes wire 74, cable conductor E, wire 75, front contact 58 of relay R2, back contact 59 of relay R1 and wire 60. Furthermore, power for the anode circuits for the tubes of the audio amplifier AA is supplied from terminal 250V of the voltage divider of the second unit through back contact 76 of the relay R3 and the primary winding 51 of the transformer T3. Again, the input side of the audio amplifier AA is now connected across the winding 61 of the transformer T1 of the receiver RA through a connection that includes wire 77, back contact 78 of relay R3, wire 79, cable conductor G, wire 80, and the ground return. It follows that frequency modulated carrier telephone current picked up by the coil 24 of the loop circuit is amplified and demodulated at the receiver RA of the first unit and the voice frequency current is further amplified at the audio amplifier AA of the second unit and the voice frequencies reproduced at the loud-speaker LS. It is also apparent that the speech is also reproduced at the earphone 62 of the headset because the earphone of the headset is still connected across the winding 61 of the transformer T1. In order to send with the two units, the operator would press the push button PB, the closing of the push button PB being effective to pick up relays R1 and R3 in multiple. A first circuit path can be traced from terminal 7.5V of the second unit, through the winding of relay R3, wire 81, one blade of switch 45, which switch is now closed, wire 82, cable conductor F, wires 83 and 84, push button PB, and ground return. The other path of this circuit includes terminal 7.5V, wire 93, cable conductor B, wire 94, front contact 55 of relay R2, winding of relay R1, wire 84, push button PB and ground return. With relay R1 picked up closing front contact 56, the connection from terminal 7.5V of the second unit is switched from the heaters of the tubes of the receiver to the heaters of the tubes of the transmitter TA, this circuit being the same as traced for energizing the relay R1 up to the winding of the relay and thence through front contact 56 of the relay to the tubes of the transmitter. With the relay R3 picked up, the connection for power to the audio amplifier AA is disconnected at back contact 76 of relay R3, and power from the terminal 250V of the voltage divider VD of the second unit is supplied to the anodes of the tubes of the modulator-oscillator MO, the circuit extending from terminal 250V of the voltage divider through front contact 76 of relay R3, resistor 95, wire 85, cable conductor D, wire 86, front contact 64 of relay R2, front contact 65 of relay R1, wire 66 and through the ground return. Again, power from the high voltage terminal 500V of the voltage divider is supplied to the anode circuit for the power amplifier PA by a ciruit completed from terminal 500V of the voltage divider through wire 87, cable conductor C, wire 88, front contact 67 of relay R2, front contact 68 of relay R1, wire 69, resistor 70, coil 24 of the loop circuit, output of the power amplifier and the ground return. Also, the microphone circuit for the headset is powered from the heater circuit for the tubes of the transmitter through resistor 42 and the microphone 71. Consequently the operator by speaking into the microphone 71 would cause a frequency modulated carrier telephone current to be supplied to the coil 24 of the loop circuit and this current will be available for inductively transferring energy to the line circuit with which the coil is positioned for inductive relationship.

It follows from the above that with the two units connected together, two-way conversation can be carried on by the operator opening and closing the push button PB to alternately energize the receiver and transmitter of the first unit from the power pack of the second unit. During the reception of a message, the message will be reproduced at both the loud-speaker LS and at the headphone 62.

In systems of the type here contemplated, a calling tone is frequently provided so that an operator can call desired remote stations. With the two units 1U and 2U used together in the manner explained hereinbefore, a calling current can be generated by the call oscillator CO and a calling signal sent out through the transmitter TA. To send a call, the switch 39 is closed while the push button PB is also closed to pick up the relays R1 and R3. With relay R3 picked up, the oscillator CO is powered from the terminal 250V of the voltage divider, the connection being completed through front contact 76 of relay R3, resistor 95, the oscillator, resistor 90, the left-hand blade of switch 39, cable conductor A and ground. With the oscillator CO thus energized, it generates a calling frequency which I have here assumed to be a frequency of the order of 1700 cycles per second. The anode circuit of the oscillator CO is now coupled to the resistor 42 of the input of the transmitter by a connection including a coupling capacitor 91, front contact 78 of relay R3, wire 79, cable conductor G, wire 80, a coupling capacitor 92, resistor 42 and ground through heater circuits. Thus, a calling current is supplied to the coil 24 and is available for transferring energy to the associated transmitting circuit. It is to be noted that by recurrently opening and closing the switch 39 the calling signal can be coded.

When the two units are used as an emergency wayside station it may be desirable to couple directly to a pair of line wires. This can be done by connecting the line wires one to the top and one to the mid terminal 29 and connecting the bottom terminal 29 to ground. The energy induced in coil 43 due to current flowing in coil 24 will be supplied to the line wires and current received from the line wires will be transferred to coil 24 through the coil 43.

Although I have herein shown and described but one form of portable and emergency equipments for inductive carrier communication systems embodying my invention, it is understood that various changes and modifications may be made therein wihin the scope of the appended claims without departing from the spirit and scope of my invention.

Having thus described my invention, what I claim is:

1. In a portable equipment unit for a two-way inductive carrier communication system which uses a transmitting line circuit, the combination comprising, a flat rectangular case of a selected light weight material and provided with means to enable the case to be carried, an assembly including a transmitter and a receiver of carrier communication current mounted in said case, the inside walls of said case formed with a recess which extends for the full longitudinal inside periphery of the case, a coil of a given number of turns of an electrical conductor secured in said recess, and said coil being provided with connections to the output of said transmitter and to the input of said receiver, said coil forming an air core inductor which is fully confined within said case to be free from contact and mechanical injury when the case is being carried and which inductor can be positioned for effective transmission and reception by induction by proper positioning of the case.

2. In a portable equipment unit for a two-way communication system, the combination comprising, a suitcase form of a housing of a selected light weight material and having means to enable the housing to be carried, an assembly including a transmitter and a receiver of carrier communication current mounted in said housing, an air core coil of a selected electrical conductor mounted in said housing and provided with connections to the output of said transmitter and to the input of said receiver in multiple, a handset, a selected side wall of said housing being formed with an external recess, means mounted in said external recess for carrying said handset when not in use, and said handset provided with a retractile cable having conductors which connect the handset to the input of said transmitter and to the output of said receiver, whereby all elements of the equipment unit are protected against injury when the housing is being carried during noncommunication periods and the unit can be used when the housing is being carried.

3. In a portable equipment unit for a two-way inductive carrier communication system, the combination comprising, a suitacase form of a housing of a light weight material and having means to enable the housing to be carried, an assembly including a transmitter and a receiver of carrier communication current mounted in said housing, a power pack including a battery mounted in said housing for energizing the transmitter and receiver, a recess formed in the inside walls of the housing for the inside longitudinal periphery of the housing, a coil of a selected electrical conductor mounted in said recess and provided with connections to the output of said transmitter and to the input of said receiver, said coil being an air core inductor which is free from said assembly and power pack and which can be disposed for effective transmission and reception of carrier communication current by induction when the housing is being carried, a handset provided with a push-to-talk switch, an external recess formed in a side wall of said housing and provided with means for carrying said handset, said handset being provided with a retractile cord having conductors which connect said handset to the input of said transmitter and to the output of said receiver, and switching means including said push-to-talk switch and conductors of said cord to selectively connect said battery either to said transmitter or to said receiver.

4. In a portable equipment unit for a two-way inductive carrier communication system, the combination comprising, a light weight flat rectangular case provided with means to enable the case to be carried, a hinged door provided as a major section of a selected side wall of the case, an assembly including a transmitter and a receiver of carrier communication current mounted in said case, a power pack including batteries mounted in said case, said assembly and power pack being readily accessible due to said hinged door, a recess formed in the inside walls of the case for the full inside longitudinal periphery of the case, a coil of an electrical conductor mounted in said recess to form an inductor of relatively large air core and which is out of the way of said assembly and power pack, said inductor coil being connected to the output of said transmitter and to the input of said receiver in multiple, a handset which is provided with a push-to-talk switch, said door formed with an external recess, means secured in said external recess for carrying said handset, said handset being provided with a retractile cord having conductors which connect the handset to the input of said transmitter and to the output of said receiver, and switching means including said push-to-talk switch and conductors of said cord to connect said batteries either to the transmitter or to the receiver.

5. In an emergency equipment for a two-way carrier communication system, the combination comprising, a first and a second case, each said case being provided with carrying means which enable the two cases to be independently carried to a given location and disposed adjacent each other, an assembly including a transmitter and a receiver of carrier communication current mounted in said first case, a push-to-talk switch mounted on an external wall of said first case, a power pack mounted in said second case, said power pack including a power source and provided with a plurality of terminals to which different direct voltages are supplied from said source, a plug connector receptacle unit mounted on each of said cases, the receptacle unit of said first case having connections to said transmitter and receiver and the receptacle unit of said second case having connections to said voltage terminals, a cable the two ends of which are provided with plug units which mate one with the receptacle unit of said first case and one with the receptacle unit of said second case, a control relay housed in said first case, a first circuit means including said push-to-talk switch and a selected conductor of said cable and receptacle connections to connect a winding of said relay to a selected one of said voltage terminals to energize or deenergize said relay according as said switch is closed or open, and a second circuit means including contacts of said relay and selected conductors of said cable and receptacle connections to connect said transmitter to selected ones of said voltage terminals or to connect said receiver to selected ones of said voltage terminals according as the relay is energized or deenergized.

6. In an emergency equipment for a two-way carrier communication system, the combination comprising, a first and a second case, each said case being provided with carrying means which enable the two cases to be independently carried to a given location and disposed adjacent each other, an assembly including a transmitter and a receiver of carrier communication current mounted in said first case, a push-to-talk switch mounted on an external wall of said first case, a power pack mounted in said second case, said power pack including a transformer, a rectifier means and a multiple terminal voltage divider; said transformer and rectifier means being connected in such a manner as to supply different selected direct voltages at said terminals of said voltage divider when an alternating voltage is applied to a primary winding of said transformer, said second case being provided with alternating voltage terminals which are connected to said primary winding, a receptacle unit of a plug connector mounted on each of said cases; the receptacle unit of said first case having connections to said transmitter, receiver and push-to-talk switch; the receptacle unit of said second case having connections to said voltage divider terminals, a cable the two ends of which are provided with plug units which mate one with the receptacle unit of the first case and one with the receptacle unit of the second case; and switching means including said push-to-talk switch, said cable and receptacle connections to selectively connect either said receiver or said transmitter to said voltage divider terminals.

7. In an emergency equipment for a two-way carrier communication system, the combination comprising, a first and a second portable case, an assembly including a transmitter and a receiver of carrier communication current mounted in said first case, a first power pack including batteries mounted in said first case and having connections for energizing said transmitter and receiver, a push-to-talk switch mounted on an external wall of said first case, control means including said push-to-talk switch and a first control relay mounted in said first case to selectively govern said battery connections to energize either said transmitter or said receiver, a second power pack mounted in said second case; said second power pack including a transformer-rectifier circuit network and a multiple terminal voltage divider, said transformer-rectifier network connected in such a manner as to supply different selected direct voltages to said voltage divider terminals when an alternating voltage is applied to a primary winding of the transformer of the network, said second case provided with alternate voltage terminals which are connected to said primary winding, interconnecting circuit means including receptacle units one mounted on each of said cases and a cable the two ends of which are provided with plug units that mate with said receptacle units, said interconnecting circuit means having connections to said transmitter and receiver and to said terminals of said voltage divider, a second control relay mounted in said first case and having connections to said interconnecting circuit means to energize the relay and automatically disconnect said batteries from said transmitter and receiver in response to a voltage being applied to a given terminal of said second power pack, and other circuit means including said push-to-talk switch and said first relay and having connections to said interconnecting circuit means to selectively connect said transmitter or said receiver to selected terminals of said voltage divider.

8. In an emergency equipment for a two-way carrier communication system, the combination comprising, a first and a second portable case, an assembly including a transmitter and a receiver of carrier communication current mounted in said first case, a handset having a push-to-talk switch mounted on an external wall of said first case; a power pack, an audio amplifier and a loud-speaker mounted in said second case; said power pack including a power source and provided with a plurality of terminals to which different direct voltages are supplied from said source, interconnecting circuit means including receptacle units one mounted on each of said cases and a cable the two ends of which are provided with plug units that mate with said receptacle units, circuit means mounted in said second case to connect said audio amplifier and loud-speaker to selected ones of said terminals, other circuit means mounted in said first case to connect said headset to the input of said transmitter and to the output of said receiver, means including connections of said interconnecting circuit means to couple the input of said audio amplifier to the output of said receiver, and switching means including said push-to-talk switch and connections of said interconnecting circuit means to connect either said transmitter or said receiver to selected terminals of said power pack.

9. In an emergency equipment for a two-way carrier communication system, the combination comprising, a first and a second case each of which is provided with carrying means which enable the two cases to be independently carried to a given location and placed adjacent each other, an assembly and a first power pack mounted in said first case, said assembly including a transmitter and a receiver of carrier communication current, said first power pack including batteries, a handset having a push-to-talk switch mounted on an external wall of said first case and connected to said transmitter and said receiver; an audio amplifier, a loud-speaker, a call oscillator and a second power pack mounted in said second case; said second power pack including a transformer-rectifier-filter network connected in such a manner as to supply different direct voltages to a plurality of terminals when an alternating voltage is supplied to a primary winding of the transformer of the network, alternating voltage terminals mounted on said second case and connected to said primary winding, an interconnecting circuit means including receptacle units one mounted on each of said cases and a cable the two ends of which are provided with plug units that mate with said receptacle units, control means including said push-to-talk switch and controlled by said interconnecting circuit means to either energize said transmitter and receiver from said batteries or to energize the transmitter and receiver together with said amplifier and loud-speaker from the voltages supplied to said terminals of the second power pack, a call control switch mounted on said second case, and other control means including said control switch and controlled by said interconnecting circuit means to at times energize said call oscillator from voltages supplied to terminals of the second power pack and to couple said oscillator to said transmitter.

EDGAR W. BREISCH.

REFERENCES CITED

The following references are of record in the file of this patent:

UNITED STATES PATENTS

| Number | Name | Date |
|---|---|---|
| 1,803,454 | Affel | May 5, 1931 |
| 2,095,679 | Dorenson | Oct. 12, 1937 |
| 2,222,114 | Morton | Nov. 19, 1940 |
| 2,312,824 | Kroger | Mar. 2, 1943 |
| 2,393,291 | Clark | Jan. 22, 1946 |
| 2,398,741 | Halstead | Apr. 16, 1946 |
| 2,439,408 | Mitchell | Apr. 13, 1948 |